United States Patent [19]
Pirone

[11] Patent Number: 5,720,856
[45] Date of Patent: Feb. 24, 1998

[54] PROCESS AND APPARATUS FOR THE PRODUCTION, PARTICULARLY DOMESTIC PRODUCTION, OF BEVERAGES

[76] Inventor: Bruno Pirone, Via S. Maurizio, 37, 12010 S. Rocco Castagnaretta, Italy

[21] Appl. No.: 356,400

[22] PCT Filed: Jun. 16, 1993

[86] PCT No.: PCT/IT93/00061

§ 371 Date: Feb. 23, 1995

§ 102(e) Date: Feb. 23, 1995

[87] PCT Pub. No.: WO93/25478

PCT Pub. Date: Dec. 23, 1993

[30] Foreign Application Priority Data

Jun. 16, 1992 [IT] Italy ................... TO92A0516

[51] Int. Cl.[6] ............... B01D 3/42; C02F 1/04
[52] U.S. Cl. ............... 203/1; 159/44; 202/160; 202/202; 202/203; 203/2; 203/10; 203/DIG. 9; 203/DIG. 18; 210/149; 210/774; 426/74; 426/591
[58] Field of Search ............... 203/10, DIG. 8, 203/DIG. 9, DIG. 18, 27, 1, 2, 49; 202/202, 185.5, 160, 200, 203; 210/149, 138–175, 248, 295, 774; 422/28, 307; 426/492–494, 74, 591; 99/275, 323.1; 159/44

[56] References Cited

U.S. PATENT DOCUMENTS

| 3,785,492 | 1/1974 | Mazza | 210/149 |
| 3,933,639 | 1/1976 | Pollastri et al. | 210/149 |
| 4,272,016 | 6/1981 | Nealy | 210/612 |
| 4,830,862 | 5/1989 | Braun et al. | 426/599 |
| 4,891,140 | 1/1990 | Burke, Jr. | 210/222 |
| 4,978,547 | 12/1990 | Petershans | 203/18 |

FOREIGN PATENT DOCUMENTS

| 1214746 | 12/1986 | Canada . |
| 1017954 | 10/1952 | France . |
| 1389616 | 1/1965 | France . |
| 2176627 | 11/1973 | France . |
| 118482 | 9/1918 | United Kingdom . |

*Primary Examiner*—Virginia Manoharan
*Attorney, Agent, or Firm*—Ladas & Parry

[57] ABSTRACT

A process and apparatus for the production of a beverage distills aqueous influent into a forerun overhead fraction that is the first result of a distillation operation, a distillate, and a bottom products fraction that is left over from the aqueous influent without being distilled. The forerun overhead fraction is removed, the distillate is sterilized and remineralized into the beverage, and the bottom products fraction is removed so the process can begin again with more aqueous influent.

10 Claims, 2 Drawing Sheets

PROCESS AND APPARATUS FOR THE PRODUCTION, PARTICULARLY DOMESTIC PRODUCTION, OF BEVERAGES

TECHNICAL FIELD

The present invention relates to a process and apparatus for the production, particularly domestic production, of beverages, particularly mineral water of desired characteristics.

BACKGROUND ART

Certain beverages are known to be produced industrially from appropriately conditioned mineral water to which natural and/or synthetic flavourings are added, and also domestically using drinking water from the public mains.

The drinking water supplied by the water mains normally presents a disagreeable taste due to the conditioning substances added to it, and not infrequently is also dangerous to the health by virtue of containing pollutant substances such as atrazine.

The above problems are only partly solved by home-made drink making apparatuses, which are normally based on ion-exchange resins and filters. These, however, eventually lose their effectiveness, and may indeed harbour bacteria in the form of pollutants accumulated in the filters and resulting in the formation of stagnant pockets.

Such problems are also not fully solved by apparatus shown in FR-A-1389616, wherein the polluted water is firstly distilled, then condensed and remineralized by percolating the distillate onto a block of mineral salts. In fact, the majority of the pollutants, such as atrazine, pass into the distillate and, consequently, are not eliminated. GB-A-118482 and CA-A-1214746 show standard distilation techniques, which, however, are not of use, because the distilled water cannot be used as such for drinking.

DISCLOSURE OF INVENTION

It is an object of the present invention to provide a process and apparatus for the production, particularly domestic production, of beverages, designed to overcome the aforementioned drawbacks, and which provides for both long-term reliability and troublefree, low-cost production.

According to the present invention, there is provided a process for the production, particularly domestic production, of beverages from an aqueous influent of any composition, comprising stages consisting in:
demineralizing said aqueous influent by distillation;
sterilizing the distillate formed in said demineralizing stage; and
remineralizing said distillate by forming a solution of the same and a mineral additive of a predetermined composition; characterized in that said distillate is formed by removing respective overhead and bottom products of said distillation.

According to the present invention, there is also provided an apparatus for the production, particularly domestic production, of beverages from an aqueous influent.

BRIEF DESCRIPTION OF DRAWINGS

A non-limiting embodiment of the present invention will be described by way of example with reference to the accompanying drawings, in which.

BEST MODE FOR CARRYING OUT THE INVENTION

Figure 1:
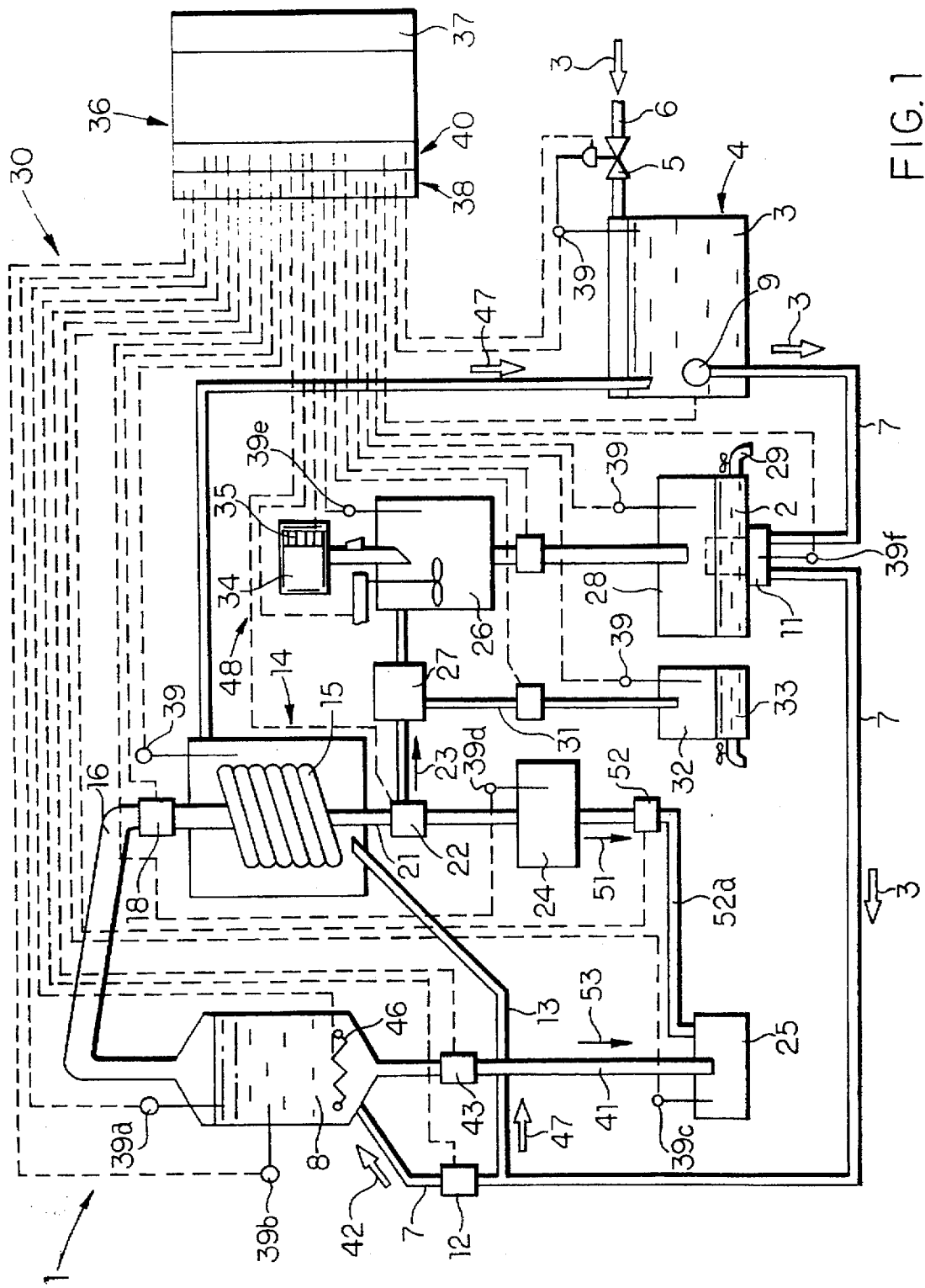
FIG. 1 shows a schematic view of an apparatus for producing beverages in accordance with the present invention.

Number 1 in FIG. 1 indicates, schematically, an apparatus for the production, particularly domestic production, of beverages 2 from an aqueous influent 3.

According to the present invention, apparatus 1 comprises an influent storage tank 4 connected by an on-off valve 5 to a water supply 6, e.g. the public water mains.

Via a circulating pump 9 and a device 11 for cooling beverage 2, a first pipe 7 connects storage tank 4 hydraulically to a boiler 8, and is controlled by a first one-off valve 12. A second branch pipe 13 upstream from valve 12 connects first pipe 7 hydraulically to the cooling circuit 14 of a condenser 15.

Downstream from boiler 8, a third pipe 16 with a second on-off valve 18 connects boiler 8 hydraulically to condenser 15.

According to the present invention, downstream from condenser 15, a fourth pipe 21 is provided with a three-way valve 22 for selectively feeding the condensate 23 from condenser 15 to a storage vessel 24 and from there to a drain tank 25, and to a mixer 26 via a filter 27, in this case an active-carbon type.

Downstream from mixer 26, a collecting tank 28 with a tap 29 is provided for collecting and dispensing beverage 2, and is cooled by device 11, in this case a Peltier-effect device connected to first pipe 7 and having a temperature sensor 39f.

According to the present invention, a fifth branch pipe 31 upstream from filter 27 is provided for feeding part of condensate 23 in fourth pipe 21 from condenser 15 to a respective tank 32 for collecting and dispensing distilled water 33.

Mixer 26 presents a dispenser 34 for soluble tablets 35 having a predetermined mineral composition, and with which to remineralize condensate 23 from condenser 15 and filter 27, and produce beverage 2.

Apparatus 1 is conveniently equipped, in the FIG. 1 example, with a control system 36 for controlling the various operations in the process for producing beverage 2.

Control system 36 is a microprocessor type, and presents respective registers 37 in which the minimum and maximum performance times of the various operations for producing beverage 2 are stored; and a data input board 38 having a known counter (not shown) for controlling the performance time of the various operations in the process, and connected by respective cables 30 (shown by the dotted lines in FIG. 1) to a number of sensors 39 on, and for controlling the respective operating parameters of, the various component elements of apparatus 1.

Control system 36 also presents an output board 40 for controlling the various actuators on apparatus 1, such as valves 5, 18 and 22, pump 9, mixer 26, cooling device 11, etc., on the basis of information received from sensors 39 via board 38 and processed by a known microprocessor (not shown) on system 36 according to a given program stored in a known memory area (not shown) on system 36.

According to the present invention, system 36 may conveniently be provided with a known console and screen (not shown) for displaying normal operating messages, and also alarms relative to malfunctioning of apparatus 1.

According to the present invention, the process for producing beverage 2 substantially comprises a first stage wherein aqueous influent 3 is demineralized by distillation. In this first stage, aqueous influent 3 is withdrawn by pump 9 from storage tank 4, and a first part of a first fraction 42 of influent 3 is fed, by opening valve 12, to boiler 8 for washing the boiler, and is drained into tank 25 by opening a second valve 43 connecting the bottom of tank 8 to drain tank 25 along a pipe 41.

Valve 43 is then closed and boiler 8 filled with a second part of first fraction 42 of influent 3, as indicated by a level sensor 39a; valve 18 on top of boiler 8 is closed; and, by means of a resistor 46, the second part of first fraction 42 of influent 3 inside boiler 8 is heated under pressure to a predetermined temperature controlled by temperature sensor 39b (which may be replaced by a pressure sensor for detecting a given overpressure).

On reaching said predetermined temperature, the heating is cut off, and boiler 8 maintained for a given length of time at above atmospheric pressure to completely sterilize said second part of first fraction 42 inside boiler 8.

At this point, valve 18 downstream from boiler 8 is opened, and overhead is drained along pipe 16 into condenser 15 and via pipe 21 and three-way valve 22 into storage vessel 24. When this is full, as indicated by level sensor 39d, system 36 opens a fourth on-off valve 52 along pipe 52a between storage vessel 24 and drain tank 25, so as to drain away a distillate overhead forerun fraction into tank 25, which is fitted with a level sensor 39c for indicating when it is full.

Condenser 15 is cooled by continuously feeding a second fraction 47 of aqueous influent 3 (along branch pipe 13) into cooling circuit 14, which second fraction 47 is then fed back into storage tank 4, the heat capacity of which is high enough to act as a disperser and so substantially restore second fraction 47 of influent 3 to its original temperature.

Level sensor 39d in vessel 24 also informs system 36 when all of distillate overhead forerun fraction has been drained off On receiving said signal, system 36 feeds condensate 23 through three-way valve 22 and active-carbon filter 27 to a device 48 for remineralizing and collecting beverage 2, and consisting of mixer 26 and collecting tank 28, where condensate 23 may conveniently be remineralized by dissolving a tablet 35 from dispenser 34. An undistilled bottom products fraction 53 remaining in the boiler 8 is drained away along pipe 41 (by opening valve 43).

Mixer 26 also presents a level sensor 39e for controlling the volume of condensate 23 inside the mixer, and for supplying system 36 with an input signal for releasing tablets 35.

Figure 2:
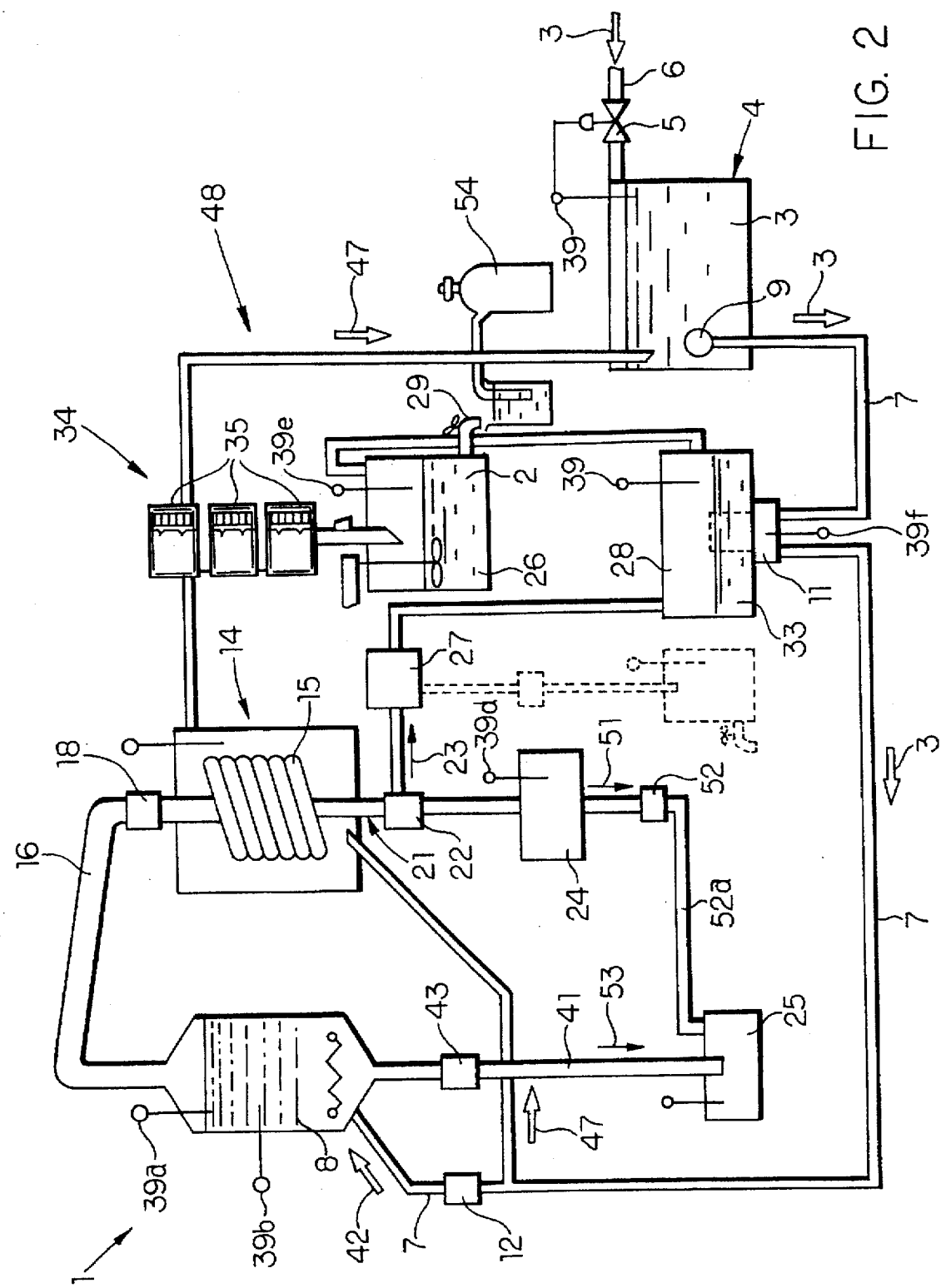
FIG. 2 shows a schematic view of a second embodiment of an apparatus for producing beverages in accordance with the present invention.

According to the variation shown in FIG. 2, wherein any parts similar or identical to those already described are indicated using the same numbering system, mixer 26 may conveniently be fitted with a number of dispensers 34 for soluble tablets 35, each having a predetermined mineral composition, possibly differing from the others, and with or without natural or synthetic flavourings for producing, with the same apparatus 1, a number of different beverages 2 catering to a wide range of different tastes.

In this particular embodiment, collecting tank 28 provides for directly collecting condensate 23 from filter 27, and is connected hydraulically upstream from mixer 26, which presents a tap 29 for beverage 2 and may conveniently be fitted with a device (54) for charging beverage 2 with gas. In this embodiment, therefore, condensate 23 from filter 27 is collected directly inside cooled tank 28, and is fed as required into mixer 26 for preparing and dispensing the required beverage, thus enabling a wide range of different beverages to be produced on the same apparatus.

The advantages of the present invention will be clear from the foregoing description. In particular, apparatus 1 provides for producing, even domestically, a wide range of water-based beverages (from drinking water, such as fizzy or natural mineral water, to soft drinks, such as orangeade, etc.) at a lower cost as compared with currently marketed beverages. Moreover, apparatus 1 is extremely versatile and reliable, by virtue of providing for troublefree, low-cost changeover from one beverage to another, by simply changing the tablet inside the dispenser.

To those skilled in the art it will be clear that changes may be made to the apparatus as described and illustrated herein without, however, departing from the scope of the present invention. For example, tank 4 need not necessarily be connected directly to water mains 6, but may be topped up each time in batch manner, e.g. manually using a bucket or jug, and with mains or well water. Similarly, tank 25 may be drained manually or by means of a pipe.

I claim:

1. A process for the production of a beverage (2) from an aqueous influent (3) comprising:

processing a first fraction (42) of an aqueous influent (3) by distillation to obtain from said aqueous influent a distillate forerun overhead fraction (51), a distillate (23) and an undistilled bottom products fraction (53), whereby said distillate (23) is demineralized;

sterilizing said distillate (23);

remineralizing said distillate (23) by forming a solution of the same and a mineral additive (35), whereby to form a beverage;

draining away said distillate forerun overhead fraction (51) and said undistilled bottom products fraction (53);

condensation of said distillate in a condenser (15) cooled by a second fraction (47) of said aqueous influent (3);

storing said aqueous influent (3) in a storage tank (4);

pumping said aqueous influent (3) from said storage tank (4) and dividing the same into said first (42) and second (47) fractions thereof; and feeding said second fraction (47) back into said storage tank (4) from said condenser (15);

wherein said storage tank (4) has sufficient volume to present a heat capacity enabling said storage tank (4) to act as a heat disperser.

2. A process for the production of a beverage (2) from an Aqueous influent (3), comprising:

processing a first fraction (42) of the aqueous influent (3) by distillation to obtain from said aqueous influent (3) a distillate forerun overhead fraction (51), a distillate (23) and an undistilled bottom products fraction (53), whereby said distillate (23) is demineralized;

sterilizing said distillate (23);

remineralizing said distillate (23) by forming a solution of the same and a mineral additive (35), whereby to form a beverage;

draining away said distillate forerun overhead fraction (51) and said undistilled bottom products fraction (53); and using a processing unit (36) to control sequentially:

withdrawing said first fraction (42) of said aqueous influent (3) from a storage tank (4);

feeding a first part of said first fraction (42) of said aqueous influent (3) into a boiler (8) by opening a first valve (12) for washing said boiler (8), and subsequently draining said first part of said first fraction (42) of said aqueous influent (3) into a drain tank (25) via a second valve (43);

closing said second valve (43) and filing said boiler (8) to a predetermined level with a second part of said first fraction (42) of said aqueous influent (3);

closing a third valve (18) on a top of said boiler (8) and heating said second part of said first fraction (42) of said aqueous influent (3) inside said boiler (8) so as to pressurize said boiler (8) to a pressure above atmospheric pressure;

cutting off said heating and maintaining said pressure inside said boiler (8) for sterilizing of said second part of said first fraction (42) of said aqueous influent (3);

opening said third valve (18), draining said distillate forerun overhead fraction (51) of said second part of said first fraction (42) of said aqueous influent (3) into a condenser (15), and, via a fourth valve (22) downstream from said condenser (15), feeding said distillate forerun overhead fraction (51) into said drain tank (25) via a storage vessel (24) of given volume located upstream from said drain tank (25);

feeding said distillate (23) from said condenser (15) through an active-carbon filter (27) and into a device (48) for said remineralizing; and collecting said beverage (2) from said device (48).

3. The process as claimed in claim 2, and further comprising:

filling a mixer (26) of said device (48) to a predetermined level with said distillate (23);

feeding at least one soluble tablet (35) with a predetermined mineral composition into said mixer (26);

activating said mixer (26) to fully dissolve said tablet (35) and so obtain said beverage (2);

cooling said beverage; and withdrawing said beverage with at least one tap (29) at a predetermined temperature.

4. An apparatus (1) for the production of a beverage (2) from an aqueous influent (3), comprising:

a storage tank (4) for storing an aqueous influent (3);

a boiler (8) for receiving a first fraction of said aqueous influent, said boiler (8) having heating means (46) for evaporating at least a part of said first fraction of said aqueous influent;

a condenser (15) connected to an overhead outlet of said boiler (8);

a mixer (26) for remineralizing a distillate (23) received from said condenser (15) into a beverage (2);

a collecting tank (28) for collecting said beverage (2); and hydraulic means for feeding from said storage tank (4) said first fraction of said aqueous influent into said boiler (8) and, for cooling said condenser (15), a second fraction of said aqueous influent, collecting and drain means (24,25) for receiving a distillate forerun overhead fraction (51) of said first fraction of said aqueous influent from said condenser (15), and selectively activated hydraulic connecting means between said storage tank (4) and said boiler (8), said overhead outlet and said condenser (15), said condenser (15) and said mixer (26) and said mixer (26) and said collecting tank (28), said selectively activated hydraulic connecting means including a first valve (22) downstream of said condenser (15) for selectively connecting said outlet to said collecting and drain means (24, 25) and to said mixer (26) and a second valve (43) to connect said boiler (8) to said drain tank (25) for said first and second valves (22,43) to remove said distillate forerun overhead fraction (51) and, from said boiler (8), a bottom products fraction (53) of said first fraction of said aqueous influent.

5. An apparatus (1) as claimed in claim 4 further comprising: a control system (36); a first pipe (7) hydraulically connecting said storage tank (4) and said boiler (8) through a regulating valve (12); a second branch pipe (13) hydraulically connecting said first pipe (7) to a circuit (14) for cooling said condenser (15); a third pipe (16) located downstream from said boiler (8) and fitted with a valve (18) hydraulically connecting said boiler (8) to said condenser (15); and a fourth pipe (21) located downstream from said condenser (15) and fitted with a three-way valve (22) for selectively feeding said collecting and drain means (24,25) and, via an active-carbon filter (27), said mixer (26).

6. An apparatus (1) as claimed in claim 5, wherein said collecting tank (28) is cooled by a device (11) for cooling said beverage (2), said cooling device (11) being connected to said hydraulic circuit (3).

7. An apparatus (1) as claimed in claim 6, further comprising a fifth branch pipe (31) upstream from said filter (27), for feeding part of the distillate (23) coming from said condenser (15), along said fourth pipe (21), to a respective tank (32) for collecting and distributing distilled water (33).

8. An apparatus (1) as claimed in claim 7, wherein said mixer (26) presents a dispenser (34) for soluble tablets (35) with which to mineralize said distillate (23).

9. An apparatus (1) as claimed in claim 7 wherein said mixer (26) presents a number of dispensers (34) for soluble tablets (35) having a mineral compositions differing to one another and containing natural or synthetic flavorings.

10. An apparatus (1) as claimed in claim 5, further comprising a tap (29) on said collecting tank (28) or said mixer (26); and a device (54) for charging said beverage (2) with gas as it is drawn off from said tap (29).

* * * * *